Feb. 28, 1956   B. W. AMMANN   2,736,346
COIL WINDING MACHINE
Filed Dec. 12, 1952   8 Sheets-Sheet 2
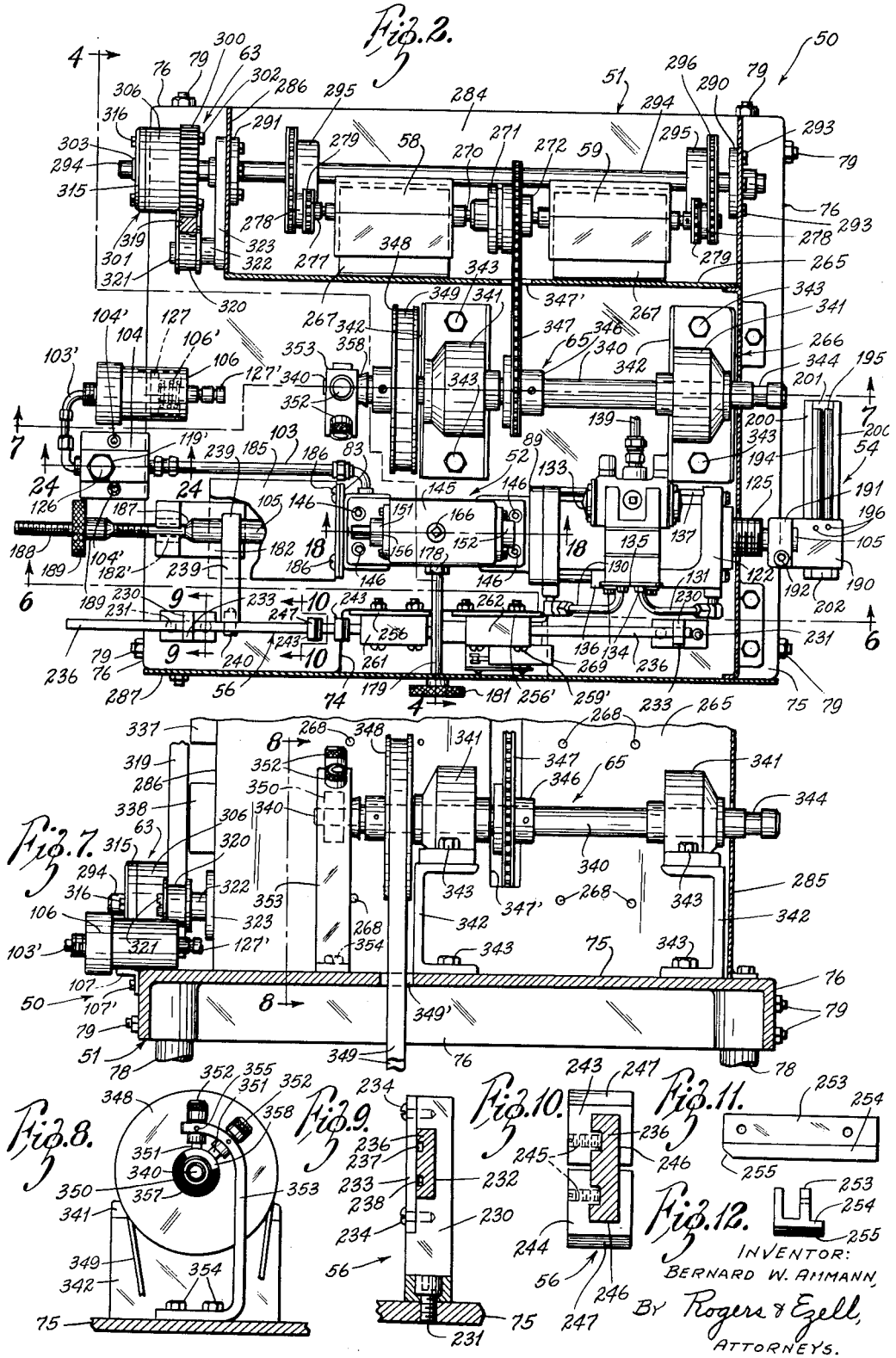
INVENTOR:
BERNARD W. AMMANN,
By Rogers & Ezell,
ATTORNEYS.

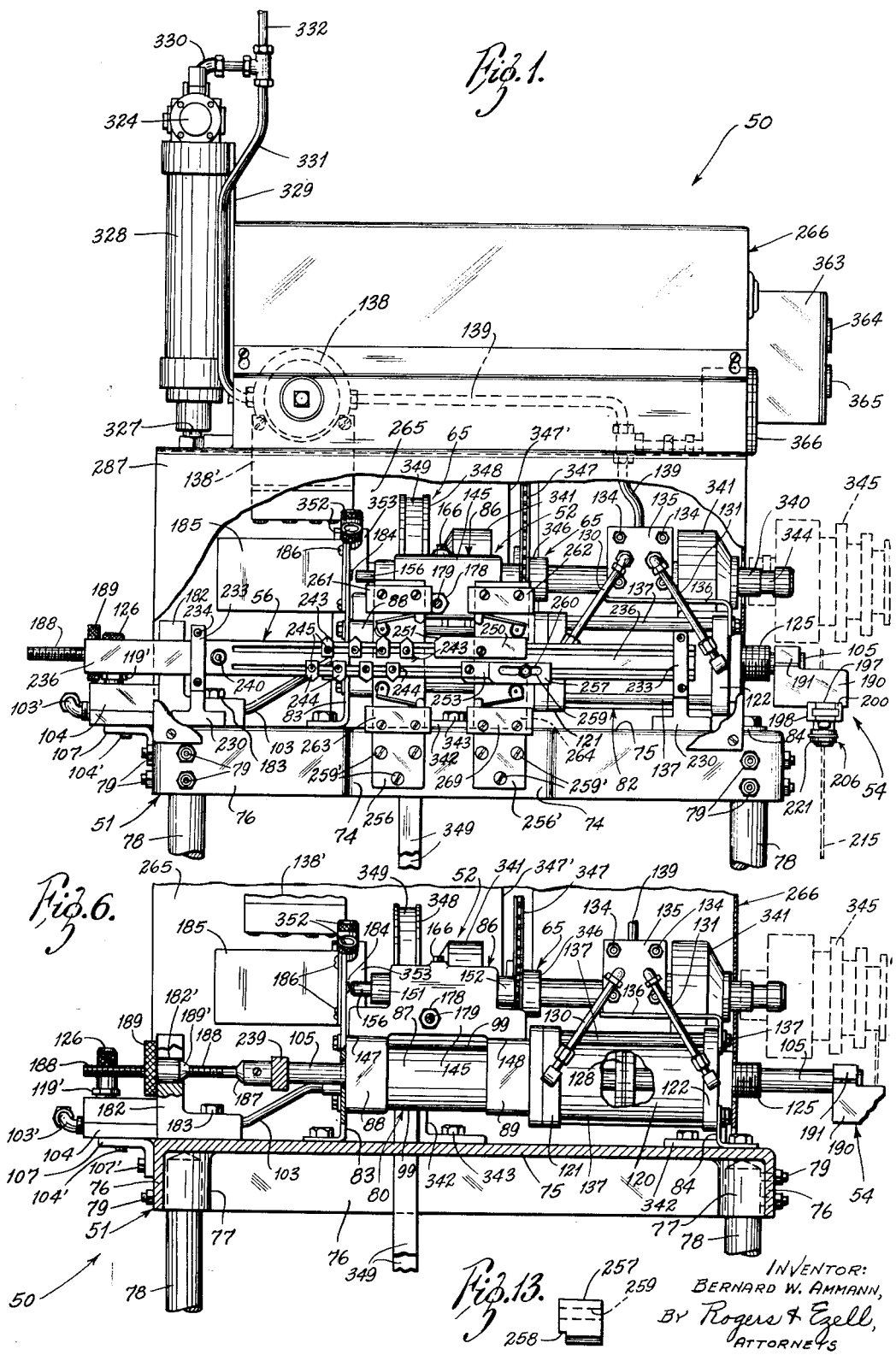

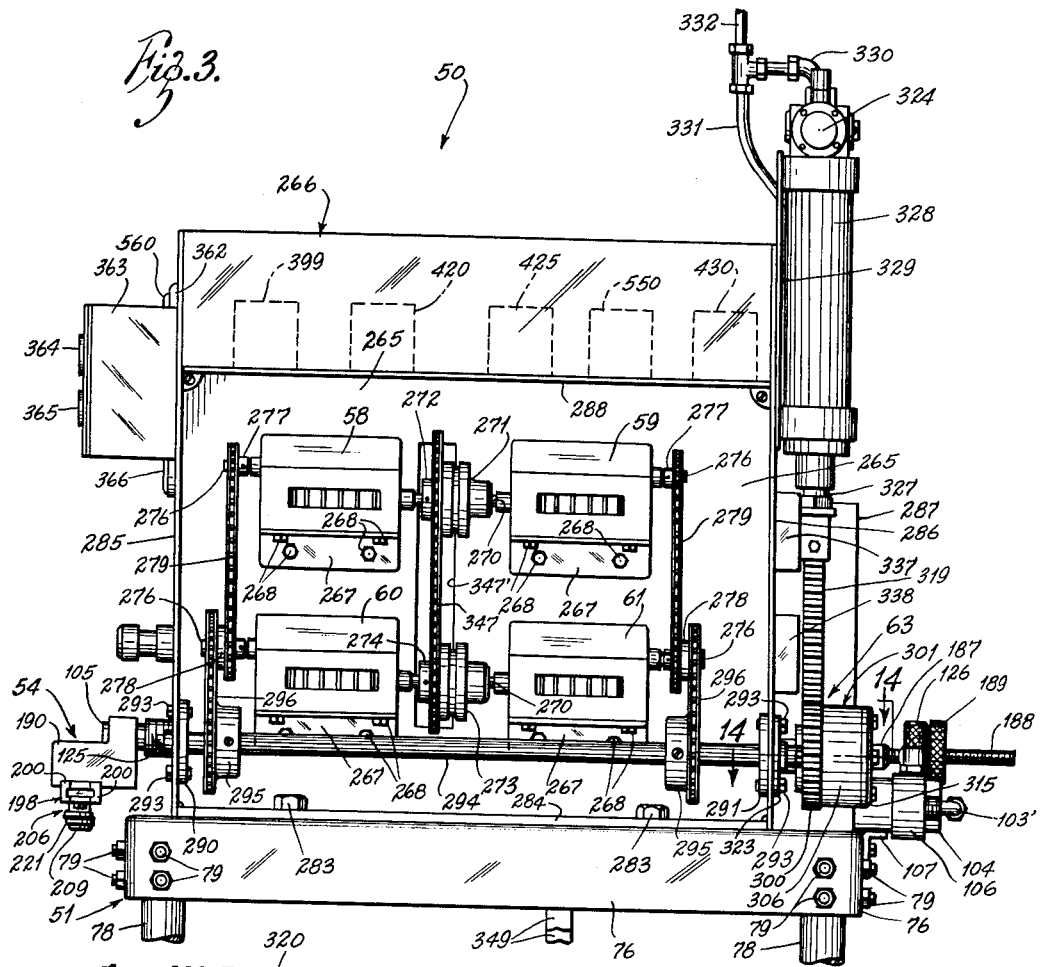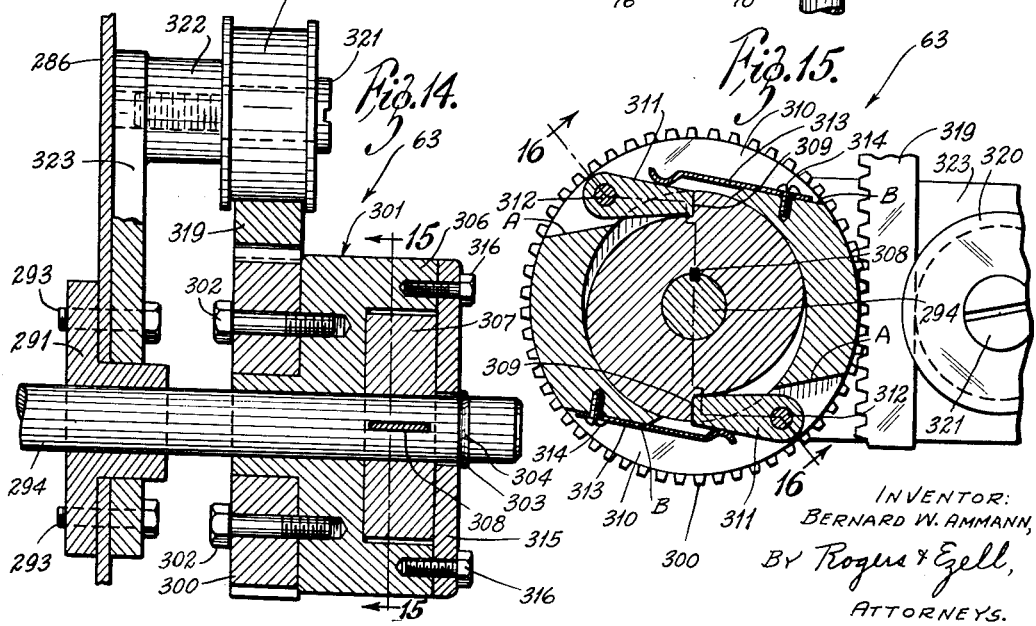

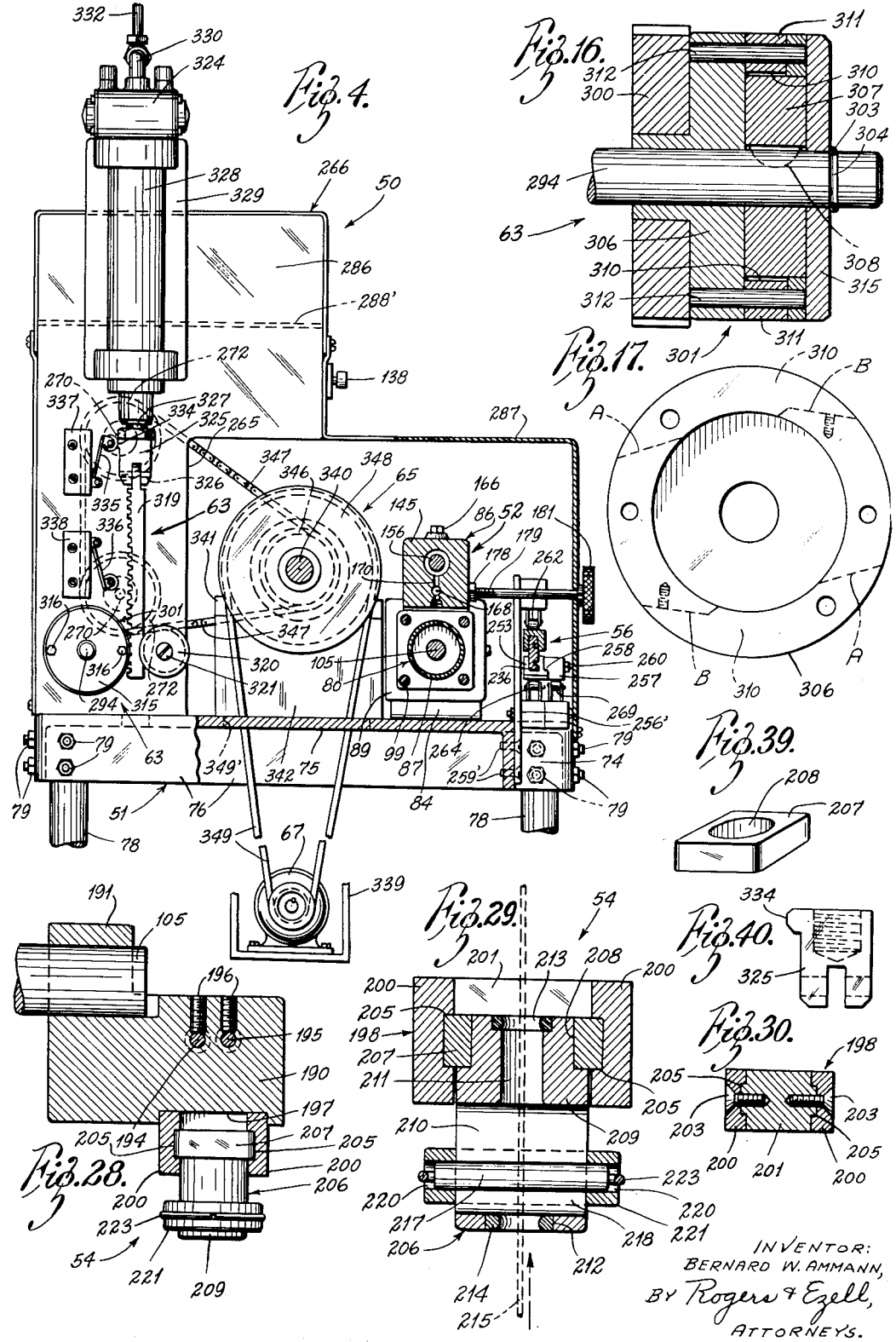

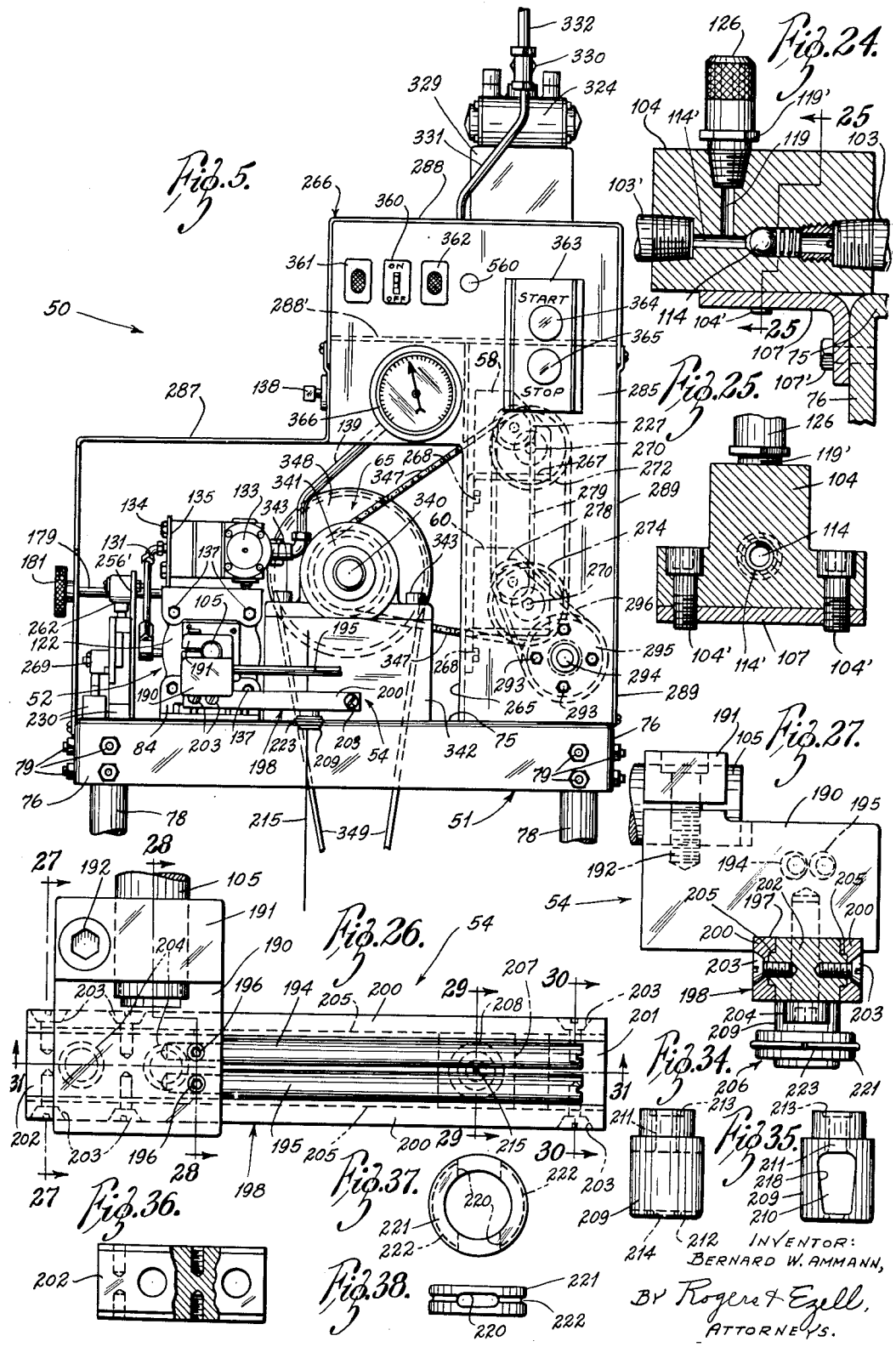

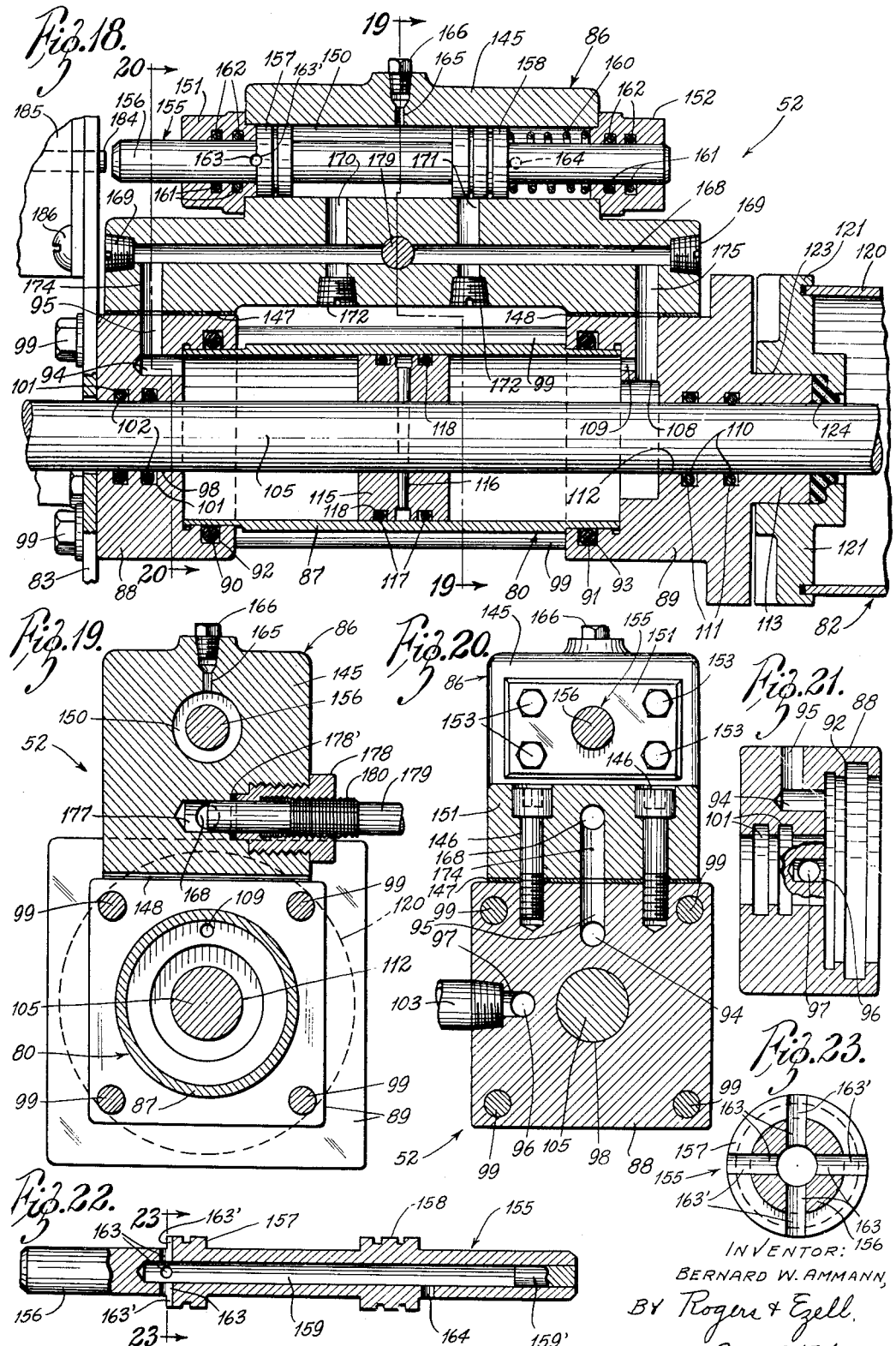

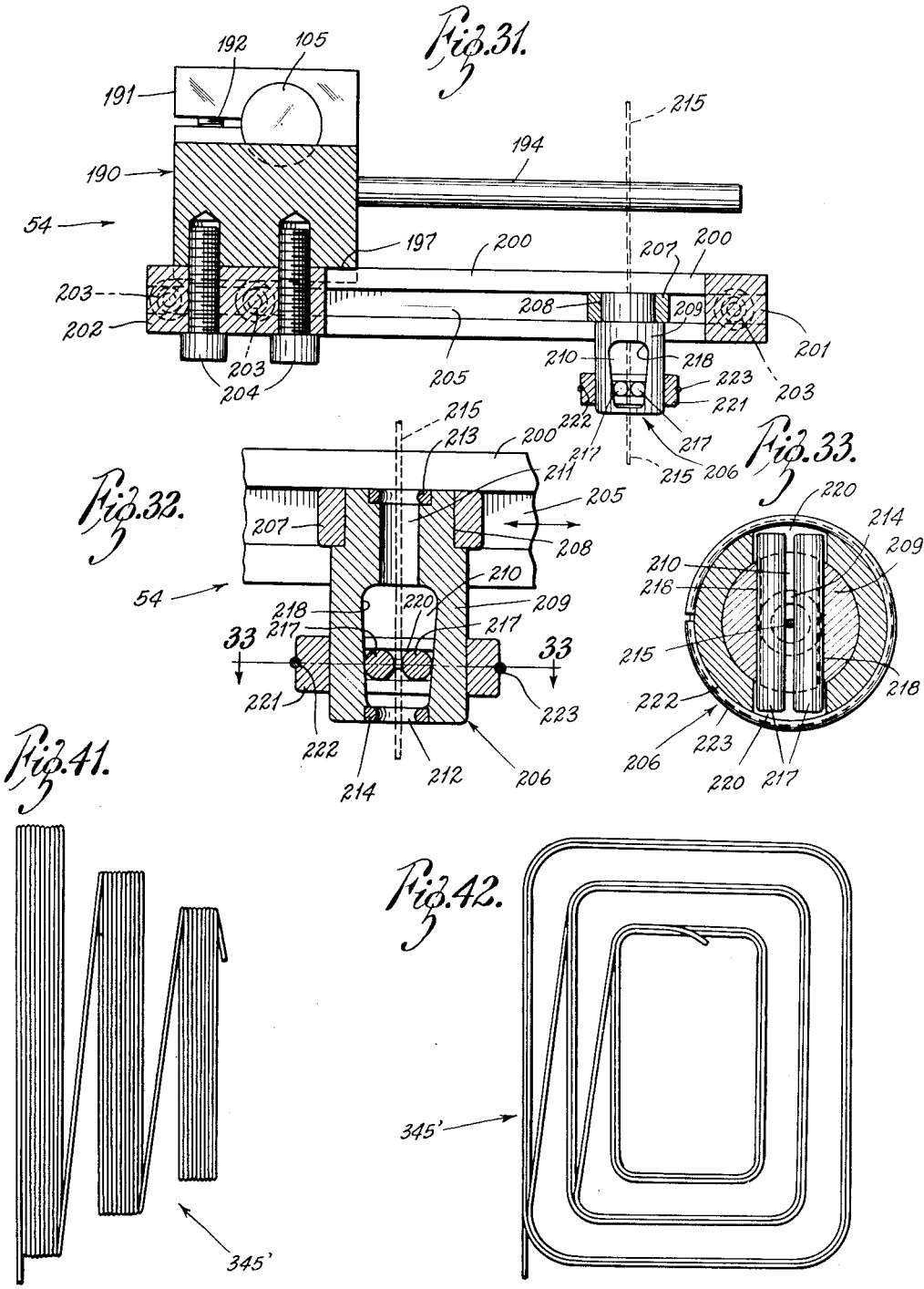

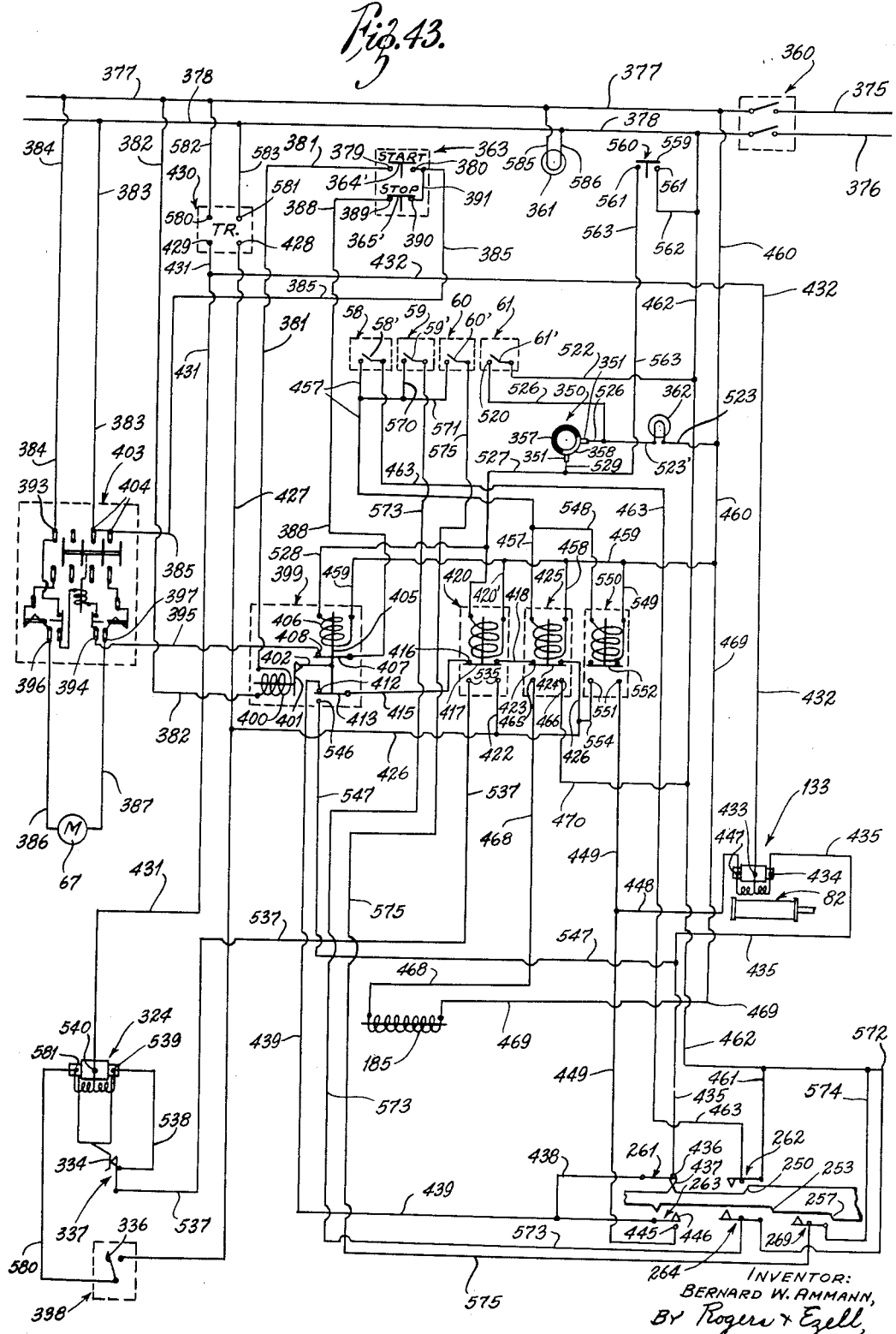

United States Patent Office 2,736,346
Patented Feb. 28, 1956

2,736,346

COIL WINDING MACHINE

Bernard W. Ammann, Northwoods, Mo., assignor to The Emerson Electric Manufacturing Company, St. Louis, Mo., a corporation of Missouri Application December 12, 1952, Serial No. 325,676

9 Claims. (Cl. 140—92.2)

The present invention relates generally to winding mechanisms, and more particularly to an automatic coil winding machine by which coils may be automatically wound of any number of steps and of any number of windings per step within the predetermined capacity of the machine.

Therefore, an object of the present invention is to provide an automatic coil winding machine by which coils may be wound of any number of steps and of any number of turns per step within the predetermined capacity of the machine, and in which the selection of number of steps and turns may be accomplished quickly and efficiently.

Another object is to provide a novel automatic coil winding machine which incorporates a plurality of counters which may be individually set to determine the number of turns of wire in a step of a coil, in which mechanism is provided for automatically resetting the counters to zero upon the completion of a coil, and in which there is also incorporated manually actuated counter reset construction.

Another object is to provide a novel automatic coil winding machine which incorporates a novel wire guide and support assembly which is adjustable for accommodating wire of different diameter.

Another object is to provide a novel automatic coil winding machine which, upon the completion of a predetermined coil, automatically returns all movable parts to starting positions.

Another object is to provide a novel automatic coil winding machine which incorporates a novel air-hydraulic cylinder assembly.

Another object is to provide a novel automatic coil winding machine which reduces to a minimum the amount of time required for reset operations when a coil of a different number of steps or a different number of turns is desired.

Another object is to provide a novel automatic coil winding machine incorporating novel construction for controlling the speed of reciprocation of a wire guide to wind a level coil.

Another object is to provide a novel automatic coil winding machine incorporating novel construction for effecting jumps of the wire guide between steps of a coil.

Another object is to provide a novel automatic coil winding machine which includes novel construction for stopping the rotating jig with its wound coil in substantially the same position at the conclusion of each winding cycle.

Another object is to provide a novel automatic coil winding machine incorporating manual as well as automatic reset construction for stopping the motor, resetting the counters and returning the operative parts to starting positions.

Other objects are to provide a novel automatic coil winding machine which is efficient in its winding cycle, which reduces to a minimum the amount of time required to reset the construction for predetermining the number of steps and the number of turns in each step of the coil, which is automatic except for the removal of the finished coil from the winding jig, and engagement of the wire end with the empty jig, which is adapted to operate at a relatively fast speed, which may be set up in multiples for attendance by a single operator, which is compact in construction thereby reducing to a minimum the amount of space occupied by the machine, which is rugged and sturdy in construction thereby insuring long periods of operation with minimum maintenance, which is relatively inexpensive to construct, and which reduces the over-all cost per coil produced.

The foregoing and other objects and advantages are apparent from the following description taken with the accompanying drawings, in which:

Fig. 1 is a front elevational view of an automatic coil winding machine constructed in accordance with the teachings of the present invention, a portion of the front cover plate being broken away to illustrate the actual winding machine in elevation and the major portion of the supporting legs being broken away for conservation of space, a winding jig and wire being shown in dotted lines (Sheet No. 1);

Fig. 2 is a plan view thereof, the cover plates being shown in horizontal cross section in order to illustrate the machine layout in plan, portions being broken away for detailed illustration (Sheet No. 2);

Fig. 3 is a rear elevational view thereof, the back cover plate being omitted (Sheet No. 3);

Fig. 4 is a vertical cross-sectional view taken on substantially the line 4—4 of Fig. 2 (Sheet No. 4);

Fig. 5 is a right end elevational view thereof, the end cover plate being broken away for better illustration of details (Sheet No. 5);

Fig. 6 is a vertical longitudinal transverse cross-sectional view on substantially the line 6—6 of Fig. 2 (Sheet No. 1);

Fig. 7 is a vertical transverse cross-sectional view on substantially the line 7—7 of Fig. 2 (Sheet No. 2);

Fig. 8 is a vertical longitudinal cross-sectional view on substantially the line 8—8 of Fig. 7 (Sheet No. 2);

Fig. 9 is an enlarged vertical longitudinal cross-sectional view on substantially the line 9—9 of Fig. 2 (Sheet No. 2);

Fig. 10 is an enlarged vertical longitudinal cross-sectional view on substantially the line 10—10 of Fig. 2 (Sheet No. 2);

Fig. 11 is an enlarged side elevational view of one cam forming part of the control bar assembly (Sheet No. 2);

Fig. 12 is an enlarged left end view thereof (Sheet No. 2);

Fig. 13 is an end view of another form of cam forming part of the control bar assembly (Sheet No. 1);

Fig. 14 is an enlarged horizontal cross-sectional view on substantially the line 14—14 of Fig. 3 (Sheet No. 3);

Fig. 15 is an enlarged vertical longitudinal cross-sectional view on substantially the line 15—15 of Fig. 14 (Sheet No. 3);

Fig. 16 is an enlarged cross-sectional view on substantially the line 16—16 of Fig. 15 (Sheet No. 4);

Fig. 17 is a front view of the one-way clutch forming part of the control reset mechanism (Sheet No. 4);

Fig. 18 is an enlarged vertical transverse cross-sectional view on substantially the line 18—18 of Fig. 2 (Sheet No. 6);

Fig. 19 is a vertical longitudinal cross-sectional view on substantially the line 19—19 of Fig. 18 (Sheet No. 6);

Fig. 20 is a vertical longitudinal cross-sectional view on substantially the line 20—20 of Fig. 18 (Sheet No. 6);

Fig. 21 is a vertical diametric cross-sectional view through the rear head of the control arm actuating cylinder, a portion being broken away to illustrate a detail (Sheet No. 6);

Fig. 22 is an enlarged view of the valve plunger, a portion being shown in diametric cross section (Sheet No. 6);

Fig. 23 is a further enlarged cross-sectional view taken on substantially the line 23—23 of Fig. 22 (Sheet No. 6);

Fig. 24 is an enlarged vertical transverse cross-sectional view on substantially the line 24—24 of Fig. 2 (Sheet No. 5);

Fig. 25 is a vertical longitudinal cross-sectional view on substantially the line 25—25 of Fig. 24 (Sheet No. 5);

Fig. 26 is an enlarged plan view of the wire guide and support assembly (Sheet No. 5);

Fig. 27 is a vertical transverse cross-sectional view on substantially the line 27—27 of Fig. 26 (Sheet No. 5);

Fig. 28 is a vertical transverse cross-sectional view on substantially the line 28—28 of Fig. 26 (Sheet No. 4);

Fig. 29 is a vertical transverse cross-sectional view on substantially the line 29—29 of Fig. 26 (Sheet No. 4);

Fig. 30 is a vertical transverse cross-sectional view on substantially the line 30—30 of Fig. 26 (Sheet No. 4);

Fig. 31 is a vertical longitudinal cross-sectional view on substantially the line 31—31 of Fig. 26 (Sheet No. 7);

Fig. 32 is a further enlarged vertical longitudinal cross-sectional view through the wire guide and check (Sheet No. 7);

Fig. 33 is a horizontal cross-sectional view on substantially the line 33—33 of Fig. 32 (Sheet No. 7);

Fig. 34 is a side elevational view of the wire guide (Sheet No. 5);

Fig. 35 is a side elevational view thereof turned through ninety-degrees (Sheet No. 5);

Fig. 36 is a plan view partly in section of a spacer member forming part of the wire guide and support assembly (Sheet No. 5);

Fig. 37 is a plan view of a retaining ring which encircles the wire guide (Sheet No. 5);

Fig. 38 is a side elevational view thereof (Sheet No. 5);

Fig. 39 is an isometric view of a base member forming part of the wire guide and assembly (Sheet No. 4);

Fig. 40 is a side view of a coupling member forming part of the counter reset construction (Sheet No. 4);

Fig. 41 is a side elevational view of a three-step coil (Sheet No. 7);

Fig. 42 is a front elevational view thereof (Sheet No. 7); and

Fig. 43 is a wiring diagram for the present machine (Sheet No. 8).

Referring to the drawings more particularly by reference numerals, 50 indicates generally an automatic coil winding machine constructed in accordance with the principles of the present invention. Broadly, the machine 50 comprises a supporting base 51 (Figs. 1–7); an air-hydraulic cylinder assembly 52 which includes a control valve (Figs. 2, 4, 5, 6, and 18 through 23); a wire guide and support assembly 54 mounted on one end of the piston rod forming part of the cylinder assembly 52 (Figs. 1 through 3 and 26 through 39); a control bar assembly 56 which is actuated by a control arm secured to the left end of the piston rod of the cylinder assembly 52 (Figs. 1, 2, 4, and 9 through 13); standard counters 58, 59, 60 and 61 together with drive mechanism therefor (Figs. 1, 2, and 3); a counter reset construction 63 which is connected to the counters 58, 59, 60, and 61 for reset thereof (Figs. 2, 3, 4, and 14 through 17); a driven spindle assembly 65 which is driven by the associated motor, to one free end of which is removably secured the coil winding jig (Figs. 2, 4, 7 and 8); a motor 67 (Fig. 4); and connecting and interrelating elements through which the several assemblies, constructions and devices are cooperatively assembled and actuated, both mechanical and electrical.

Referring in greater detail to the several parts making up the present machine 50, the supporting base 51 is shown as of rectangular configuration and includes a supporting floor 75 and depending flanges 76 which form a continuous periphery (Figs. 1 through 7). The floor 75 includes a front recess 74. At each corner is a downwardly opening well 77 which receives a supporting post 78, suitable lock screw assemblies 79 maintaining the post 78 in place.

The air-hydraulic cylinder assembly 52 includes a hydraulic cylinder unit 80 and an aligned air cylinder unit 82 which are supported by brackets 83 and 84 (Figs. 2, 4–6, and 18–23). Atop the hydraulic cylinder unit 80 is a valve unit 86.

The hydraulic cylinder unit 80 includes a cylinder 87, one end of which is received by a rear head 88 and the other by a front head 89 (Figs. 6, and 18–21). Suitable sealing rings 90 and 91 disposed in internal annular grooves 92 and 93 in the heads 88 and 89, respectively, maintain a tight seal against oil leakage from the cylinder 87. Tie bolts 99 extend through the head 88 and are anchored in threaded wells in the head 89 to secure the heads 88 and 89 and the cylinder 87 together. The bolts 99 also secure the head 88 to the bracket 83. The rear head 88 is of the configuration clearly shown in Figs. 18, 20, and 21 and, in addition to the annular groove 92, includes connecting fluid passages 94 and 95, connecting fluid passages 96 and 97, and an annular central bore 98. Annular ring-receiving grooves 101 are formed about the bore 98, and receive rings 102 which engage a piston rod 105 extending through the cylinder 87 and through the bore 98. A composite oil line 103 threadedly taps into an enlarged threaded portion of the fluid passage 97, leading from a check valve 104 which is connected to an oil reservoir 106 by an oil line 103' (Figs. 2, 24, and 25). Bolts 104' secure the valve 104 to a bracket 107 which is fastened to the flange 76 of the base 51 by bolts 107'. A spring-biased check ball 114 normally closes a passage 114' through the valve 104. An oil fill passage 119 leads from the passage 114' which receives a Zerk fitting 119' or the like closed by a threadedly received cap 126. Within the reservoir 106 is a piston 127 biased against the oil therein by a spring 106'. A rod 127' extends from the piston 127 through the end of the reservoir 106. As oil in the system is consumed, as by accidental or inevitable leakage, the rod 127' quickly or gradually recedes into the reservoir 106, thus serving as an oil status indicator. The spring 106' is slightly stronger than the spring biasing the check ball 114, so that oil may be forced past the check ball 114 when demanded by the system. The oil system must be maintained oil full and air free to insure accurate operation of the air-hydraulic cylinder assembly 52.

The front head 89 is of the configuration shown in Figs. 6 and 18 and, in addition to the internal annular groove 93, includes connecting radial and axial passages 108 and 109, respectively, internal annular grooves 111 which receive sealing rings 110, an annular central bore 112, and an external annular flange portion 113. The shaft 105 extends through the bore 112. Within the cylinder 87 is a piston 115 which is secured to the rod 105 by a suitable taper pin 116. Suitable annular grooves 117 are provided in the periphery of the piston 115 which receive sealing rings 118.

The aligned air cylinder unit 82 includes a cylinder 120 and heads 121 and 122 (Figs. 6 and 18) secured together by tie bolts 137 which extend through smooth holes in the head 122 and threaded holes in the head 121, and threadedly engage threaded wells in the head 89. The head 121 abuts the head 89 and includes an external well 123 which receives the flange 113 of the head 89. The piston rod 105 extends through suitable openings in the heads 121 and 122, being sealed at the head 121 by a deformable sealing ring 124, and at the head 122 by the same or other suitable sealing means (not shown). A guide and bearing support 125 is formed integral with the head 122 (Fig. 6). Within the cylinder 120 is a composite piston 128 which is secured to the rod 105 by a taper pin or the like. Air lines 130 and 131 are tapped into the heads 121 and 122, respectively, and communicate with the interior of the cylinder 120 at opposite sides of the piston 128 by conventional passages formed in the heads 121 and 122. The air lines 130 and 131 are connected at their other ends with a standard double solenoid air valve 133 (Fig. 2) secured by suitable bolts 134 to a vertical plate 135 secured by welding or otherwise to the horizontal arm of a bracket 136 which is supported from the head 122 by one of the tie bolts 137 (Fig. 6). An air supply line 139 leads into the valve 133 and is connected with a suitable source of air under pressure (not shown). A pressure regulator 138 of standard construction is connected into the air supply line 139 and is mounted on an interior panel 265 through a bracket 138' (Fig. 1).

The valve unit 86 mounted on the cylinder unit 80 includes a housing 145 which is generally rectangular in form and is of the configuration shown in Figs. 2, 6, and 18. Suitable screws 146 extend through vertical openings in reduced end portions of the housing 145 and into threaded wells in the heads 88 and 89 to maintain the valve unit 86 in place. Gaskets 147 and 148 are disposed between the housing 145 and the heads 88 and 89, respectively.

A longitudinally extending passage 150 is formed in the upper part of the housing 145 and is closed at its ends by bearing plates 151 and 152 which are secured to the ends of the housing 145 by suitable screws 153 (Figs. 18 and 20). Within the passage 150 is a valve member 155 including a valve stem 156 and spaced cylindrical valve heads 157 and 158. A compression spring 160 bearing against the bearing plate 152 and the piston head 158 biases the valve member 155 to the left in engagement with the bearing plate 151. The valve member 155 has a central bore 159 closed by a plug 159' from which extend four radial bleeder passages 163 at the left of the head 157, the head 157 having grooves 163' forming continuations of the passages 163 (Figs. 18, 22, and 23). A radial bleeder passage 164 extends from the bore 159 at the right of the head 158. Pressure is thereby equalized on the outer faces of the heads 157 and 158. The head 157 is provided to neutralize oil pressure on the head 158. Suitable sealing rings 161 disposed in grooves 162 in the bearing plates 151 and 152 engage the valve stem 156. It is to be noted that the valve stem 156 extends beyond the bearing plate 151 a substantial amount. A passage 165 of small diameter leads vertically from the passage 150, being enlarged and threaded at its upper portion to receive one end of an air bleeder plug 166.

Beneath the passage 150 is a passage 168 of smaller diameter than the passage 150 which extends longitudinally through the greatest length of the housing 145 and is capped at each end by suitable threaded plugs 169. Spaced vertical passages 170 and 171 of the same diameter as the passage 168 communicate the passages 150 and 168. Threaded plugs 172 are shown closing the lower ends of continuations of the passages 170 and 171, these continuations being formed in the operation by which the passages 170 and 171 are formed as a convenience. Vertical passages 174 and 175 are in alignment with the passages 95 and 108, respectively, in the heads 88 and 89, suitable openings being formed in the gaskets 147 and 148 so that the passage 168 is in communication at each end with the interior of the cylinder 87.

A horizontal passage 177 extends forwardly from the passage 168, including an enlarged threaded portion which receives an internally and externally threaded fitting 178, the connection being oil tight through a sealing ring 178' (Fig. 19). A metering shaft 179 has an end portion of substantially the internal diameter of the inner portion of the passage 177 which extends thereinto and which is rendered oil tight by the sealing ring 178', the metering shaft 179 including an enlarged threaded portion 180 threadedly engaging the interior of the fitting 178. A suitable knurled operating knob 181 is secured to the free end of the metering shaft 179 for rotation thereof (Fig. 2). It is to be noted that the diameter of the end of the metering shaft 179 is greater than the diameter of the passage 168 and that the inner end of the passage 177 extends inwardly beyond the passage 168 so that the metering shaft 179 may, as extremes of operation, be rotated to fully interrupt communication between the right and left halves of the passage 168 or to establish full communication therebetween (Figs. 18 and 19). Normally, the inner end of the metering shaft 179 is in an intermediate metering position such as is shown in Fig. 19. As is more fully explained below, the position of the metering shaft 179 determines the speed of the back and forth movement of the piston rod 105 in winding the wire in a step of a coil on the provided jig, which movement is slower for smaller diameter wire than larged diameter wire to insure a level wound coil.

A jump solenoid 185 including a core or plunger 184 is mounted on a vertical extension of the bracket 83 by suitable screws 186 in a position for engagement of the plunger 184 with the extended end of the valve stem 156 (Figs. 2, 6, and 18). Upon energization of the solenoid 185, its plunger 184 moves the valve stem 156 to the right a predetermined distance against the force of the spring 160. This operation is more fully set forth below.

The piston rod 105 has a frusto-conical left end 187 which receives a threaded reduced extension 188 (Figs. 2 and 6). An adjustable knob stop 189 having a frusto-conical end 189' is threaded onto the extension 188. A stop block 182 of angle form is secured to the floor 75 of the base 51 by bolts 183 and includes an opening 182' through which the extension 188 extends. The position of the knob stop 189 determines the selected starting position of the wire guide (described below).

As stated, the wire guide and support assembly 54 is mounted on the right end of the piston rod 105 (Figs. 1 through 3, and 26 through 39). The assembly 54 includes a block 190 of the configuration clearly shown in Figs. 26 through 28. The block 190 incorporates an integral split clamp portion 191 which receives the extreme right end of the piston rod 105. A bolt 192 secures the block 190 in clamped position on the piston rod 105. Parallel horizontal wire guide rods 194 and 195 have reduced eccentric extensions received in wells extending into one side of the block 190. The eccentric extensions provide means for adjusting the distance between the rods 194 and 195. Suitable setscrews 196 secure the rods 194 and 195 against removal and in selected position of adjustment. A channel 197 is formed in the underside of the block 190 and receives a composite slide 198.

The slide 198 is generally of elongated rectangular form and includes side members 200 which are secured to end spacer members 201 and 202 by suitable countersunk screws 203 (Figs. 26, 27, 30 and 36). Bolts 204 extend through the spacer member 202 and threadedly engage wells formed in the block 190. Each side member 200 includes an internal longitudinal channel 205 which supportingly receives a wire retainer unit 206.

The wire retainer unit 206 includes a base 207 (Figs. 29 and 39) which is slidably disposed in the opposed channels 205 of the side members 200 and has a central circular aperture 208 which receives the reduced upper end of a wire retainer housing 209 (Figs. 29, and 31 through 35). Interiorly, the wire retainer housing 209 includes a chamber 210 of frusto-conical form. A passage 211 communicates the chamber 210 with the outside at the top of the housing 209 and a short passage 212 at the bottom thereof. Rings 213 and 214 of hardened steel are disposed at the openings of the passages 211 and 212, respectively, for buffer engagement by a wire 215 passing through the wire guide housing 209. Within the chamber 210 are parallel horizontal rollers 217, the ends of which extend through opposed openings 218 formed in the annular wall of the housing 209 and into opposed slots 220 formed in a retaining ring 221 disposed about the housing 209 (Figs. 32, 33, 37 and 38). The ring 221 has an annular external groove 222 which receives a snap-on split wire ring 223 which prevents dislodgment of the rollers 217. The wire 215 passes through the passage 212, between the rollers 217, upwardly through the passage 211, and between the rods 194 and 195, as is clear from Figs. 32 and 33. The rollers 217 will permit movement of the wire 215 upwardly, but will be forced toward each other by the downwardly converging walls of openings 218 to clampingly engage it upon attempted movement downwardly, thereby preventing the wire 215 from falling out of the retainer housing 209 upon severance thereof at the completion of a coil. The retaining ring 221 is free to slide vertically on the housing 209 in order to permit the rollers 217 to accommodate wires of different diameters.

The control bar assembly 56 is mounted on the floor 75 of the supporting base 51 forwardly of the air-hydraulic cylinder assembly 52 (Figs. 1, 2, 4, and 9 through 13). Spaced composite control bar guide members 230 of inverted T-shape are secured by suitable screws 231 to the floor 75 of the base 51. Each guide 230 includes a bar receiving slot 232, one side of which is formed by a removable strip 233 secured in place by suitable screws 234. A control bar 236 is slidably received in the spaced slots 232. The control bar 236 has spaced longitudinal channels 237 and 238 which extend for a major portion of the length thereof, as is clear from Fig. 1. A control arm 239 is secured to the control bar towards one end thereof by a suitable screw 240. The control arm 239 extends laterally from the control bar 236 and is secured to the left end of the piston rod 105. Hence, the control bar 236 is moved by the piston rod 105.

Four upper trip dogs 243 and four depending lower trip dogs 244 are mounted on the control bar 236 and are secured thereto by suitable setscrews 245 (Figs. 1 and 10). Each trip dog 243 and 244 is of the configuration clearly shown in Figs. 1, 2, and 10, each including a channel 246 of the cross section of one-half of the cross section of the control bar 236 and intersecting tripping or camming surfaces 247. A greater or lesser number of dogs 243 and 244 may be employed, although four each are required for winding a four-step coil. A cam member 250 (Fig. 1) of inverted U-shaped cross section, including a camming face 251, is slidably mounted on the upper edge of the control bar 236, being adjustably secured thereto by a suitable setscrew which extends into the channel 237. A second cam member 253 of U-shaped cross section is mounted in suspended relation against the bottom edge of the control bar 236, being secured thereto by a suitable setscrew which extends into the channel 238 (Figs. 1, 11, and 12). The cam member 253 includes a shoulder 254 and a camming face 255. A third cam member 257 includes a shoulder 258 complementary to the shoulder 254 of the cam 253, and is mounted in contiguous relation to the cam member 253 with the shoulders 254 and 258 in supporting relation. The cam 257 also includes a slot 259 through which a suitable screw 260 extends for maintaining the cam 257 in secured adjusted relation in respect to the cam 253.

The trip dogs 243 and 244 actuate switches 261 and 263, and the cam members 250, 253, and 257 actuate interrupter switches 262, 264, and 269, respectively. The switches 261 and 263 are secured by suitable screws to a vertical plate 256, and the switches 262 and 264 to a vertical plate 256', both plates being secured to a flange 76 in the recess 74 by suitable screws 259'. The switches 261, 262, 263, 264, and 269 are of standard type, each including an outwardly biased actuating spring arm carrying a roller at the free end, it being understood that depression of a spring arm closes that particular switch.

The counters 58, 59, 60, and 61 are mounted on an interior panel 265 which forms part of a casing generally designated 266 which covers a major portion of the working parts of the machine 50, and which is described in detail below (Figs. 2, 3, and 5). A bracket 267 supports each of the counters, being secured to the bottom of each and to the panel 265 by suitable bolts 268.

Each of the counters 58, 59, 60, and 61 includes a power input shaft 270. The shafts 270 of the opposed counters 58 and 59 support and are secured to each other for simultaneous drive by a flexible coupling 271 which supports a sprocket 272. Similarly, a flexible coupling 273 connects the shafts 270 of the counters 60 and 61 for simultaneous drive and supports a sprocket 274. Each counter 58, 59, 60, and 61 also includes a reset shaft 276. The reset shafts 276 of the counters 58 and 59 support single reset sprockets 277, and the reset shafts 276 of the counters 60 and 61 support double sprockets 278. A chain 279 connects each of the reset sprockets 277 and one sprocket element of each of the double reset sprockets 278.

In addition to the interior panel 265, the casing 266 includes side panels 285 and 286, a front panel 287 having a stepped form, a removable top panel 288, an interior horizontal panel 288' welded to the side panels 285 and 286, a rear panel 289, and a base panel 284 (Figs. 1–5). The base panel 284 is secured to the floor 75 by bolts 283 (Fig. 3), and forms a guide and support for the side panels 285 and 286 and the interior panel 265 which are welded thereto. Suitable screws and bolts and welding maintain the casing 266 in assembled relation, and lend ready dismantling.

The side panels 285 and 286 support aligned bearings 290 and 291 secured thereto through suitable bolts 293 (Figs. 2 and 3). A shaft 294 is rotatably received by the bearings 290 and 291. Spaced sprockets 295 are secured to the shaft 294 opposite the double reset sprockets 278 by setscrews or the like, a chain 296 being disposed about each sprocket 295 and the other sprocket element of the double reset sprockets 278.

The counter reset construction 63 includes a gear 300 and a one-way clutch 301 secured together by suitable screws 302 and mounted on the left end of the shaft 294 (Figs. 2 through 4, and 14 through 17). A snap ring 303 in a groove 304 in the shaft 294 prevents removal of the connected gear 300 and the clutch 301. The clutch 301 includes a cup-shaped housing 306 within which is disposed a disc ratchet 307 which is secured to the shaft 294 by a key 308. The ratchet 307 is cut away on opposed sides to provide shoulders 309. The wall of the cup-shaped housing 306 includes opposed slots 310, the end walls being formed as is indicated by the dotted lines A and B in Fig. 17, and as is clearly shown in Figs. 15 and 16. A pawl 311 is mounted in each slot 310 on a pin 312 and is biased towards engagement with the ratchet 307 by a flat spring 313 secured to an end wall of the slot 310 by a suitable screw 314. Engagement of the pawls 311 with the shoulders 309 prevents counterclockwise rotation of the disc 307 (Fig. 15). The pins 312 are maintained in place by a cover 315 and the gear 300, the cover 315 being secured to the annular wall of the cup-shaped member 306 by suitable screws 316.

A vertically disposed rack 319 is in engagement with the gear 300, the back of the rack 319 being engaged by a flanged idler wheel 320 mounted on a suitable screw 321 threadedly engaging a post 322 welded or otherwise secured to a plate 323 mounted on the panel 286 by the screws 293 which support the bearing plate 291 (Fig. 14). The rack 319 is secured to a coupling member 325 by a suitable pin 326, the coupling member 325 being threaded onto the end of the piston rod 327 of a standard air cylinder 328 (Figs. 3, 4, and 40). A solenoid valve 324 actuates the air cylinder 328. The air cylinder 328 and valve 324 are mounted on a plate 329 which is welded or otherwise secured to the panel 286. A common air supply line 332 communicates through a standard T-fitting with an air line 330 which supplies air to the solenoid valve 324 for selective controlled introduction to the ends of the air cylinder 328, and with an air line 331 which leads to the pressure regulator 138 and thence to the air supply line 139 (Figs. 1–4). The valve 324 is in communication with opposite ends of the air cylinder 328 by means of internal passages (not shown) formed in the casing of the latter, both the valve 324 and the cylinder 328 being conventional assemblies which are specifically different from the conventional valve 133 and cylinder 120. The coupling member 325 includes a double cam 334 which is alternately engageable by the outwardly spring-biased roller supporting arms 335 and 336 of switches 337 and 338, respectively, secured by suitable bolts to the panel 286 which control the solenoid valve 324 (Figs. 3 and 4).

The driven spindle assembly 65 is best shown in Figs. 1, 2, 4, 7 and 8, and includes a shaft 340 rotatably mounted in spaced pillow blocks 341 mounted on support brackets 342 of channel cross section, suitable bolts 343 securing the pillow blocks 341 to the support brackets and the support brackets 342 to the floor 75 of the supporting base 51. The shaft 340 extends through an opening in the panel 285 and is formed with a wide annular channel 344 for removable reception of a collapsible coil winding jig 345 which is indicated in dotted lines in Fig. 1 and on which is wound a coil such as the three-step coil 345' shown in Figs. 41 and 42. A sprocket 346 is secured to the shaft 340 intermediate the blocks 341 and in a vertical plane with the sprockets 272 and 274, these three sprockets receiving a chain 347 which passes through an opening 347' in the interior panel 265. Outwardly of the left block 341 is a sheave 348 which is secured to the shaft 340 by a suitable setscrew or the like. The sheave 348 receives a drive belt 349 which drops through an opening 349' in the floor 75 and also engages the driving pulley of the motor 67 which is suspended beneath the floor 75 on a bracket 339 (Fig. 4). A circuit interrupter 350 is secured to the shaft 340 adjacent the sheave 348 which is shown as ring-shaped including a portion 357 greater than one-half of non-conductive material and a portion 358 of conductive material, and which is engaged by spaced brushes 351 mounted in brush holders 352 which are supported by a bracket 353 anchored to the floor 75 by suitable screws 354 (Figs. 7 and 8). Suitable setscrews 355 maintain the brush holders 352 in selected position.

An electric power switch 360 is mounted on the outer face of the panel 285 conveniently near the top thereof, which is shown as of the standard on-and-off toggle type. Adjacent the switch 360 are trouble red and operation green lights 361 and 362, respectively, the former of which when illuminated indicating that the switch 360 is closed and power is on, and the latter when illuminated that the counter reset circuit is closed. Also mounted on the panel 285 is a switch 363 including start and stop buttons 364 and 365, respectively, through which the machine 50 may be placed in operation after the switch 360 has been snapped to "on" position. A pressure gauge 366 is mounted on the panel 285 near the switches 360 and 363, and is connected into the air supply line 139 between the pressure regulator 138 and the solenoid air valve 133.

The horizontal panel 288' supports a 110-8 volt transformer 430, a latch-in relay 399, and three additional relays 420, 425 and 550 which are more particularly referred to below in the description of the wiring diagram of Fig. 43 and in the operation.

*Wiring circuits*

Fig. 43 is a wiring diagram showing the electrical circuits through which the present machine 50 functions. Power source leads 375 and 376 are connected to the stationary terminals of the power switch 360, power leads 377 and 378 being connected to the movable contacts thereof.

A starting circuit is provided as follows: a start contact bridge 364' of the start-stop switch 363 connected for operation to the start button 364, spaced stationary contacts 379 and 380 with which the start bridge 364' is engageable, a lead 381 connected to the stationary contact 379, a latch-in relay coil 400 of a latch-in relay 399 which includes a spring-loaded pivoted latch 401, lead 382, the power lead 377, the power lead 378, a lead 383, connected terminals 404 of a standard motor starter 403, and a lead 385 connected into the stationary contact 380. This starting circuit effects energization of the relay coil 400 which retracts its rod to release the latch 401 from engagement with a member 402 fixed to a spring-loaded rod 405 of a relay coil 406. Connected to the rod 405 for movement therewith are spaced pivoted switch arms 407 and 413 engageable with stationary contacts 408 and 412, respectively. Release of the member 402 effects closing of the switch arms 407 and 413 with the stationary contacts 408 and 412, respectively, to establish a 110-volt motor circuit and an 8-volt circuit through the solenoid air valve 133.

The motor starter circuit is traced as follows: the stationary contact 408, the switch arm 407, lead 388, stationary contacts 389 and 390 and stop contact bridge 365' of the start-stop switch 363 (the bridge 365' being actuatable by the stop button 365), lead 391, the lead 385, the terminals 404 of the starter 403, the lead 383, the power leads 378, 377, lead 384, terminals 393 and 394 of starter 403, lead 395 back to the stationary contact 408. Energization of the motor starter 403 effects starting of the motor 67 connected into terminals 396 and 397 thereof by leads 386 and 387, respectively.

Low voltage circuits are provided for alternatively energizing the two opposed solenoids of the air valve 133 through which the piston 128 of the air cylinder unit 82 is reciprocated. One of the circuits is established simultaneously with establishment of the motor starter circuit by engagement of the switch arm 413 with the contact 412. This circuit is traced as follows: the stationary contact 412, the switch arm 413, lead 415, a pair of stationary contacts 416 and a bridging contact 417 of a relay coil 420, a lead 418, a pair of stationary contacts 423 and a bridging contact 424 of a second relay coil 425, lead 426, lead 427, terminal 428 on the 8-volt side of a 110-8-volt step-down transformer 430, terminal 429 of the transformer 430, lead 431, lead 432, ground terminal 433 of the two solenoids of the air valve 133, terminal 434 of the right solenoid thereof, lead 435, fixed contact 436 of the normally open switch 261, movable switch arm 437 thereof, lead 438, and lead 439 back to the stationary contact 412.

The circuit for effecting movement of the air valve 133 in the opposite direction is identical with the foregoing circuit, except the current path from the ground terminal 433 to the lead 439 is via terminal 447 of the left solenoid, lead 448, lead 449, and stationary contact 445 and movable switch arm 446 of the normally open switch 263.

Each of the counters 58, 59, 60, and 61 has an internal contact sustaining switch which closes at the reach of its respective predetermined count. The switches are indicated in Fig. 43 as 58', 59', 60', and 61', respectively. Each of the switches 58', 59', and 60' is in a circuit for effecting establishment of a circuit through the jump solenoid 185. This circuit established by the switch 58', when closed, is traced as follows: stationary contact of the switch 58', lead 457, the relay coil 425, leads 458, 459, 460, the power leads 377, 378, lead 462, lead 461, movable switch arm and stationary contact of the normally closed switch 262, and a lead 463 back to the movable contact of the switch 58'.

The similar circuit of the switch 59' of the counter 59 is traced as follows: stationary contact of the switch 59', lead 570, lead 571, the lead 457, the relay coil 425, the leads 458, 459, 460, 377, 378, 462, lead 572, movable switch arm and stationary contact of the normally closed switch 264, and lead 573 back to the movable contact of the switch 59'.

The similar circuit of the switch 60' of the counter 60 is traced as follows: stationary contact of the switch 60', the leads 571, 457, the relay coil 425, the leads 458, 459, 460, 377, 378, 462, a lead 574, movable switch arm and stationary contact of the normally closed switch 269, and a lead 575 back to the movable contact of the switch 60'.

The aforesaid circuits, through the switches 58', 59', and 60', when closed, energize the relay coil 425 to establish a circuit in the 8-volt system for effecting a jump or movement of the rod 105 and connected control bar assembly 56 and wire guide and support assembly 54 to the left. Energization of the relay coil 425 effects ejection of its spring-loaded plunger and movement of the bridging contact 424 carried thereby into bridging relation with the stationary contacts 465 and 466. The circuit of the jump solenoid 185 thus established is traced as follows: the stationary contact 465, lead 468, the jump solenoid 185, lead 469, the leads 460, 377, 378, 462, and lead 470 back to the stationary contact 466. This circuit, when thus established, energizes the jump solenoid 185, the function of which, in respect to the cylinder assembly 52, is set forth below under "operation".

A relay coil 550 is provided to insure immediate jump of the piston 115 to the next winding step, regardless of any intermediate position between the particular alternating dogs 243 and 244, said relay coil 550 being energized every time the relay coil 425 is energized. Leads 548 and 549 tie the relay coil 550 into the leads 457 and 459, respectively. When the relay coil 550 is energized, lower stationary contacts 551 are closed by bridging contact 552 to establish a circuit in the 8-volt system, which is traced as follows: right stationary contact 551, the leads 449, 448, terminal 447 of the left solenoid, ground terminal 433, the leads 432, 431, terminal 429 of the transformer 430, terminal 428 thereof, the leads 427, 426, lead 554, the other stationary contact 551, and the bridging contact 552.

The counter 61 effects three functions upon the completion of its predetermined count which comprise the shutting off of the motor 67, the resetting of the four counters 58, 59, 60, and 61 to zero, and the return of the rod 105, pistons 128 and 115, and assemblies 54 and 56 to starting position. The closing of the switch 61' upon the counter 61 reaching its predetermined count establishes a circuit which is traced as follows: movable contact of the switch 61', lead 522, the leads 462, 378, 377, 460, 459, the relay coil 406, the leads 528, 527, lead 529, the circuit interrupter 350, and lead 526 back to stationary contact of the switch 61'. The relay coil 406 is energized upon the establishment of the foregoing circuit, which effects movement of the rod 405 to break engagement of the switch arm 407 with the stationary contact 408, thereby breaking the motor circuit. At the same time, the switch arm 413 is pivoted from engagement with the stationary contacts 412 into engagement with a stationary contact 546. The latch 401 engages the member 402 fixed to the rod 405 to maintain this aforesaid established relation. At the same time, the parallel circuit through the trouble light 362 is established as follows: the closed switch 61', the leads 522, 462, 378, 377, 460, lead 523, the light 362, lead 523', and the lead 526 back to the switch 61'.

The relay coil 420 is simultaneously energized with the relay coil 406 upon closing of the switch 61', which effects ejection action of its associated rod carrying the bridging contact 417, which thereupon bridges stationary contacts 535, thereby establishing the counter reset circuit which is traced as follows: one stationary contact 535, lead 537, the normally open reset switch 337 which is maintained in closed position by the cam 334 of the coupling member 325 disposed on the end of the piston of the air cylinder 328, lead 538, terminal 539 of the right solenoid of the two solenoid air valve 324, ground terminal 540 of the two solenoids, the lead 431, the terminal 429 of the transformer 430, the terminal 428 thereof, the leads 427, 426, and lead 422 back to the other stationary contact 535. Establishment of the foregoing circuit sets the double solenoid air valve 324 to effect movement of the piston of the air cylinder 328 downwardly in a counter resetting movement until the cam 334 closes the switch 338 through engagement with the actuating arm 336 thereof.

The circuit for effecting return of the piston of the air cylinder 328 to starting position is traced as follows: the movable contact of the switch 338, lead 580, terminal 581 of the left solenoid of the double solenoid air valve 324, the ground terminal 540, the lead 431, the 8-volt terminals 429 and 428 of the transformer 430, and the lead 427 back to the stationary contact of the switch 338. It is noted here that the solenoids of the double solenoid air valve 324 need only be momentarily energized to set the position of the valve member of the air valve 324, since the solenoid rod remains on the side to which it is moved by the particular energized solenoid, there being no return spring, which is a construction well known in the electrical art.

Closing of the switch 61' of the counter 61 also effects return of the rod 105, the pistons 128 and 115, and the assemblies 54 and 56 to starting positions, the electrical circuit being traced as follows: 8-volt terminal 428 of the transformer 430, the leads 427, 426, the stationary contacts 423 and bridging contact 424 of the relay coil 425, the lead 418, the stationary contacts 416 of the relay coil 420, the lead 415, the movable switch arm 413, the fixed contact 546, lead 547, the lead 435, terminal 434 of the right solenoid, the ground terminal 433, the lead 432, and the lead 431 back to the terminal 429 of the transformer 430.

A manual reset circuit is provided for effecting return to a starting position of the counters 58–61 should the automatic return fail to function, or at any time during a cycle. There is provided a push button 560, movement of which inwardly establishes a circuit which is traced as follows: bridging contact 559 and stationary contacts 561 of the push button switch 560, lead 563, the lead 527, the relay coil 420, the leads 420', 459, 460, 377, 378, 462, and lead 562 back to the stationary contact 561. Establishment of this circuit energizes the coil 420 and effects establishment of the previously described circuit through the solenoids of the reset air cylinder 328.

A circuit is provided for stopping the motor 67 at any time which is traced as follows: bridging contact 365', stationary contact 389, lead 388, switch arm 407, stationary contact 408, the lead 395, terminals 394, 393, the leads 384, 377, 378, 383, the terminals 404 and connector, the lead 385, and lead 391 back to the stationary contact 390.

The transformer 430 includes 110-volt terminals 580, 581 which are connected across the power leads 377, 378, respectively, by leads 582 and 583, respectively. The operation light 361 is connected across the power leads 377, 378, by leads 585, 586, respectively. This light 361 is preferably green and indicates, when illuminated, that the switch 360 is closed.

Operation

In Fig. 1, the machine 50 is shown in its substantially final position of movement with a coil 345' wound on the jig 345. Since a three-step coil is shown wound, the fourth upper and lower trip dogs 243 and 244 are shown to the right of the switches 261 and 263. In Fig. 6, the machine 50 is shown in its starting position.

Closing the switch 360 supplies the machine 50 with power. Before pushing the start button 364, a winding jig 345 is secured to the shaft 340, and the wire 215 is trained through the housing 209 of the wire support unit 206 and through the wire guide rods 194 and 195 and its free end engaged with the jig 345. The counters 58, 59, 60, and 61 are set as required, and the dogs 243, 244 and the cams 250, 253 and 257 properly positioned.

The start button 364 is pushed inwardly which effects energization of the motor 67, the circuits being described above, which mechanically drives the predetermining counters 58, 59, 60, and 61 and the jig 345 through the belt 349, the sheave 348, the shaft 340, the chain 347, the sprockets 346, 272 and 274, the flexible couplings 271 and 273, and power input shafts 270 of four counters.

Simultaneously with energization of the motor 67, the left solenoid of the solenoid air valve 133 is energized which sets the air valve 133 for flow of air under predetermined pressure into the right side of the air cylinder unit 82, thereby driving the piston 128 thereof to the left (Figs. 1, 6, 18, and 43). The normally open switch 263 is closed by the left or first lower trip dog 244 at the start of the winding operation.

The rate of movement of the piston 128 to the left is determined by the hydraulic cylinder unit 80 and its associated valve unit 86, the rod 105 tying the piston 128 and the piston 115 together for simultaneous movement. The units 80 and 86 are filled with oil as stated; movement of the piston 115 to the left is accomplished only by forcing oil from the left half of the cylinder 87 through the passages 94, 95, 174 and into the passage 168, by the end of the metering shaft 179, and through the passages 175, 108 and 109 into the right half of the cylinder 87. Manifestly, the rate of flow of the oil is determined by the setting of the metering shaft 179.

The piston 128, rod 105, piston 115, control bar assembly 56, and the wire guide and support assembly 54 move to the left until the first upper trip dog 243 engages and depresses the actuating arm of the switch 261, thereby establishing a circuit through the right solenoid of the solenoid air valve 133 which is energized to reset the air valve 133 to direct air under pressure into the left side of the air cylinder unit 82 and to exhaust air from the right side thereof. Thereupon, the piston 128 and its rod 105 are moved to the right, the piston 115 determining the rate of movement as aforesaid, the oil in the units 80 and 86 flowing in the reverse direction as set forth above. Movement to the right continues until the first lower trip dog 244 again engages the actuating arm of the switch 263, whereupon the originally energized left solenoid of the air valve 133 is again energized, and the foregoing cycle is repeated, thereby winding the coil in level layers. It is to be noted that the solenoids of the solenoid air valve 133 need only be momentarily energized to operate the air valve 133 to direct air to the right or left of the piston 128, since a single valve member or spool is moved back and forth. Any standard unit may be employed. This is also true of the reset solenoid air valve.

This cycle is repeated until the predetermining counter 58 reaches its predetermined count, whereupon it mechanically closes its switch 58' and establishes the jump circuit through the jump solenoid 185. Upon energization, the solenoid 185 ejects its plunger 184 into engagement with the free end of the valve member 155, moving it to the right (Fig. 18) against the force of the spring 160. The head 158 is moved from covering position with the passage 171, thereby permitting the oil in the valve unit 86 to bypass the metering shaft 179.

At the same time the relay coil 425 is energized to establish the circuit through the jump solenoid 185, the relay 550 is energized which effects ejection of its core or rod to bridge the stationary contacts 551 with the bridging contact 552 to establish the circuit through the left solenoid of the solenoid air valve 133. This circuit bypasses the existing circuit through either the switch 261 or switch 263, and insures the positioning of the air valve 133 to supply air to the right side of the piston 128 of the air cylinder unit 82. Since the passage 171 is free from the valve head 158 at this instant, the piston 128, the rod 105, the piston 115, and the assemblies 54 and 56 jump to the left a predetermined amount since the oil in the cylinder unit 80 and valve unit 86 may pass from the left side of the piston 115 to the right side thereof through the passages 170 and 171, bypassing the restriction in the passage 168 at the inner end of the metering shaft 179. It is preferable that this jump be effected in a time period not greater than required for one-fourth revolution of the shaft 340, which may be rotated at from 300–500 R. P. M. Hence, the jump is effected in a fraction of a second.

As the control bar assembly 56 is jumped to the left (Fig. 1), the cam member 250 opens the normally closed switch 262 at a predetermined point of advance which interrupts the circuit through the switch 58' of the counter 58, this switch 58' being a sustained contact type switch, and, hence, it is required to be interrupted, or else the solenoid 185 will continue its effective positioning of the valve member 155 in its extreme inward position of movement. Manifestly, interruption of the circuit of the switch 58' deenergizes the relay coil 425, permitting return of its spring-loaded plunger to bridging relation with the upper contacts 423, thereby breaking the circuit through the jump solenoid 185. Simultaneously, the relay coil 550 is deenergized, whereupon its spring-loaded plunger breaks engagement with the stationary contacts 551 and returns to its position as shown in Fig. 43, thereby interrupting the bypass circuit through the left solenoid of the solenoid air valve 133. Interruption of the circuit through the jump solenoid 185 permits the spring 160 to return the valve member 155 to its position in which the valve head 158 covers the passage 171 as is shown in Fig. 18.

The second step of the coil 345' is thereupon wound in the same manner as the first step thereof, the air valve 133 being reciprocated through alternate energization of its left and right solenoids by engagement of the second lower trip dog 244 and upper trip dog 243 with the actuating arms of the switches 263 and 261, respectively. As the predetermining counter 59 reaches its predetermined count, it mechanically closes its switch 59', thereby energizing the jump solenoid 185 and providing a circuit through the left solenoid of the solenoid air valve 133. A second jump of the piston 128, rod 105, piston 115, and assemblies 54 and 56 is effected in the same manner as the first jump. The cam member 253 opens the normally closed switch 264 at a predetermined point in the movement of the control bar assembly to the left, interrupting the circuit through the sustaining switch 59' and turning over control of the solenoids of the solenoid air valve 133 to the third lower trip dog 244 and upper trip dog 243, whereupon the foregoing cycle is repeated for the third step.

If the coil 345' is of the three-step type, as illustrated in Figs. 41 and 42, the predetermining counter 61 will be set in the same manner as the predetermining counter 60 which controls the count and jump for the third step. Therefore, as the winding of the third step is completed, the switches 60' and 61' of the predetermining counters 60 and 61 are mechanically closed. The switch 60' of the third predetermining counter 60 is ineffective, for the cam 257 is preset to open the switch 269 prior to the completion of the count of the counter 60. The closing of the switch 61' establishes a circuit via the circuit interrupter 350 through the relay coil 406 which effects ejection of its rod 405, thereby breaking the 110-volt motor circuit and establishing a circuit in the 8-volt system through the right solenoid of the solenoid air valve 133, which is effective to return the piston 128, rod 105, and assemblies 54 and 56 to starting positions.

At the same time, the relay coil 420 is energized, effecting ejection of its plunger and closing the circuit through the right solenoid of the reset solenoid air valve 324 of the counter reset air cylinder 328. Air under pressure is thereby provided at the upper side of the piston of the air cylinder 328, effecting descent of the rack 319, which mechanically, through the clutch 301 and associated elements, the shaft 294, the chains 279 and 296 and related elements, returns the counters 58, 59, 60 and 61 to zero (Figs. 3, 4, and 14). As the piston of the air cylinder 328 reaches its lower position of movement, the cam 334 of the coupling member 325 engages the actuating arm 336 of the switch 338 to close the same, thereby establishing a circuit through the left solenoid of the solenoid air valve 324. Thereupon, air is supplied beneath the piston of the air cylinder 328 and exhausted from above the same to return the piston and its connected rack 319 to starting positions.

The circuit interrupter 350 interrupts the motor circuit in the same position of rotation in each instance so that the usual brake provided on the motor 67 will stop it, the shaft 340, and the jig 345, in each instance, in substantially the same position. With the switch 61' closed, the circuit through the relay coil 406 is completed as the portion 358 of the interrupter 350 bridges the brushes 351, thus deenergizing the starter 403 and motor 67. Since the shaft 340 carrying the interrupter 350 is rotating at a speed of from 300 to 500 R. P. M., the conductive portion 358 is of a little greater extent than just necessary to bridge the brushes 351 to insure stopping the motor 67. The motor 67 turns only a revolution or so after the current is interrupted, the position of the interrupter 350 on the shaft 340 being correlated therewith to stop the jig 345 as desired. Jigs are formed with a slot for receiving a tie wire or clip which is necessary to maintain the steps of the coil 345' in wound relation. Stopping the jig with this slot in generally uppermost position expedites engagement of the three steps of the coil by the required clip or wire segment, since, manifestly, a search for the position of this slot consumes the time of an operator and slows down production.

As soon as the machine 50 completes its cycle, the operator secures the steps of the coil 345' with a clip or a wire, severs the wire 215 above the wire guide rods 194 and 195, and removes the coil 345' from the jig 345. The foregoing complete cycle is then repeated in the winding of additional coils 345'.

Should the automatic counter reset fail for some reason or another, the push button 560 may be actuated to close a circuit through the relay coil 420 to effect ejection of its plunger in the establishment of the 8-volt circuit through the right solenoid of the solenoid air valve 324 to effect reset of the counters 58, 59, 60, and 61. Further, the motor 67 is shut off, and the rod 105 and associated elements and assemblies are returned to starting positions. This manual counter reset may be employed at any stage of the winding cycle if desired or required.

The stop button 365 may be pushed at any time to stop the motor 67, the circuit being traced above. Manifestly, stopping the motor 67 stops the winding operation, although the machine 50 may continue to reciprocate under the air power. This reciprocation may be stopped by the switch 560, as aforesaid.

The four upper trip dogs 243 and the four lower trip dogs 244 are individually adjustable along the control bar 236 so that they may be positioned to wind coil steps of any preferred depth and of any preferred spacing between coil steps. Furthermore, the cam members 250, 253, and 257 are adjustable on the control bar 236 so that termination of each jump may be precisely predetermined, or a predetermined switch 262, 264 or 269 closed in advance to eliminate a jump.

The predetermining counters 58, 59, 60, and 61 are of standard construction and may be set to effect any number of turns for each step of the coil being wound. It is a simple matter to set the counters individually for any desired number of turns. Furthermore, a coil including one to four steps may be wound, it being understood that where a single step is desired, the four counters 58, 59, 60 and 61 are set to the same reading. Where two steps are desired, counter 58 predetermines the first step, counter 59 predetermines the second step, and counters 60 and 61 are set to correspond to the counter 59.

The wire retainer unit 206 manifestly slides freely in the side members 200 of the slide 198 during coil winding, and prevents the wire 215, when severed from a wound coil, from dropping to the floor. The guide rods 194 and 195 are adjustable as stated and are disposed beneath the jig 345 and as close thereto as is possible in order to direct the wire onto the jig 345 in even layers. The criss-crossing of the wire 215 in a step of a coil is not desirable.

It is clear from the foregoing that the speed of movement of the piston 128 may be controlled by the air pressure, which preferably averages forty-five pounds per square inch, or by the metering of the oil within the units 80 and 86 by the metering shaft 179. It has been found preferable to maintain the air pressure reasonably constant and to vary the position of the metering shaft 179.

It is manifest that there has been provided an automatic coil winding machine which may be readily adjusted with minimum loss of time to wind coils of any number of steps and any number of turns per step within the capacity of the machine, and that the objects and advantages sought for such improved machine have been achieved.

It is to be understood that the foregoing description and the accompanying drawings have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In a coil winding machine, in combination, a base, a shaft rotatably supported on said base adapted to receive a winding jig, an electric motor for driving said shaft, driving connecting means between said shaft and motor, an air cylinder mounted on said base disposed horizontally including a piston, a hydraulic cylinder aligned with said air cylinder including a piston, a common piston rod extending fully through and beyond both of said cylinders and pistons, said two pistons being secured to said rod, a two solenoid reciprocable valve connected to said air cylinder for alternatively supplying air to opposite sides of said air cylinder piston for reciprocating said piston rod, an adjustable metering valve connected into said hydraulic cylinder at opposite sides of its piston so that oil in said hydraulic cylinder and metering valve is moved back and forth through said metering valve by said hydraulic cylinder piston as said piston rod is reciprocated by said air cylinder piston to determine the speed of movement of said piston rod, a wire support and guide supported on one end of said piston rod and disposed beneath a winding jig mounted on said rotatable shaft, a plurality of predetermining counters mounted on said base for predetermining the number of turns in each step of a coil being wound, there being one counter for each step of a coil, two stationary spaced opposed switches mounted on said base in circuit with the solenoids of said solenoid valve for reversing the movement of said piston rod, a control bar mounted on said base and secured to said piston rod for movement therewith, spaced upper and lower dogs adjustably mounted on said bar, a pair of upper and lower dogs being alternately engageable at a time with said stationary switches for winding a step of a coil, means for jumping the piston rod to engage the next pair of upper and lower dogs with said switches energized by the predetermining counter immediately effective in counting wire turns upon completion of its count including a solenoid, an oil bypass around said metering valve, and a plunger moved by said solenoid to render said bypass effective, a switch associated with each counter controlling a jump for rendering the jump circuit ineffective upon movement of said piston rod to its new winding position, and means for stopping said motor upon completion of a coil including a momentarily effective circuit maker for stopping the rotatable shaft in substantially the same position each time.

2. In combination, a coil winding machine on which coils of a selectively predetermined number of steps and of a selectively predetermined number of turns per step are automatically wound comprising a base, a member for receiving a coil winding jig rotatably mounted on said base, power means for rotating said member, a wire guide, and means for supporting said wire guide in operative positions for feeding wire onto a rotatably supported coil winding jig comprising an actuating air-hydraulic cylinder assembly including a hydraulic cylinder and piston, an air cylinder and piston aligned with said hydraulic piston, means for alternately supplying air to opposite sides of the air cylinder piston, a common piston rod connected to both pistons and extending beyond said cylinders, an adjustable metering valve interconnected with said hydraulic cylinder determining the rate of oscillating movement of said piston rod, and means for rendering said metering valve momentarily inoperative upon the completion of the initial and intermediate steps of a coil to permit a predetermined jump of said cylinder assembly to a new winding position, said wire guide being mounted on said piston rod for reciprocative and jump movement therewith.

3. In combination, a coil winding machine on which coils of a selectively predetermined number of steps and of a selectively predetermined number of turns per step are automatically wound comprising a base, a member for receiving a coil winding jig rotatably mounted on said base, power means for rotating said member, a wire guide, means for supporting said wire guide in operative positions for feeding wire onto a rotatably supported coil winding jig comprising an actuating air-hydraulic cylinder assembly including a hydraulic cylinder and piston, an air cylinder and piston aligned with said hydraulic piston, means for alternately supplying air to opposite sides of the air cylinder piston, a common piston rod connected to both pistons and extending beyond said cylinders, an adjustable metering valve interconnected with said hydraulic cylinder determining the rate of oscillating movement of said piston rod including a passage communicating the opposite ends of said hydraulic cylinder and an adjustable restricting valve in said passage, and automatically operable means for rendering said metering valve momentarily inoperative upon the completion of the initial and intermediate steps of a coil to permit a predetermined jump of said cylinder assembly to a new winding position including a by-pass passage around said restricting valve, a reciprocable valve normally closing said by-pass, and a solenoid having a plunger engageable with said reciprocable valve to move the same to open said by-pass upon energization of said solenoid, said solenoid being energized at the completion of the initial and intermediate steps of a coil, said wire guide being mounted on said piston rod for reciprocative and jump movement therewith, and means for insuring an immediate jump in the required direction of movement regardless of the immediate direction of movement of said piston rod.

4. In a coil winding machine, in combination, a base, mechanism for supporting a wire support and guide and for oscillating and moving the same axially of a winding jig comprising an air cylinder mounted on said base disposed horizontally including a piston, a hydraulic cylinder aligned with said air cylinder including a piston, a common piston rod extending fully through and beyond both of said cylinders and pistons, said two pistons being secured to said rod, a two solenoid reciprocable valve connected to said air cylinder for alternately supplying air to opposite sides of said air cylinder piston for reciprocating said piston rod, an adjustable metering valve connected into said hydraulic cylinder at opposite sides of its piston so that oil in said hydraulic cylinder and metering valve is moved back and forth through said metering valve by said hydraulic cylinder piston as said piston rod is reciprocated by said air cylinder piston to determine the speed of movement of said piston rod, a wire support and guide supported on one end of said piston rod and disposed adjacent a winding jig, two stationary spaced opposed switches mounted on said base in circuit with the solenoids of said solenoid valve for reversing the movement of said piston rod, a control bar mounted on said base and secured to said piston rod for movement therewith, spaced upper and lower dogs adjustably mounted on said bar, a pair of upper and lower dogs being alternately engageable at a time with said stationary switches for winding a step of a coil, and means for jumping the piston rod to engage the next pair of upper and lower dogs with said switches including a solenoid, an oil bypass around said metering valve, and a plunger moved by said solenoid to render said bypass effective.

5. In a coil winding machine, in combination, a base, mechanism for supporting a wire support and guide and for oscillating the same during a coil winding operation comprising an air cylinder mounted on said base, a piston in said air cylinder, a piston rod secured to said piston and extending through said air cylinder, a wire support and guide secured to one end of said piston rod for operative movement therewith, a hydraulic cylinder mounted on said base, a piston in said hydraulic cylinder, a piston rod secured to said hydraulic cylinder piston and extending through said hydraulic cylinder, said piston rods being secured together for simultaneous movement, means for alternately introducing and exhausting air to opposite sides of said air piston to reciprocate the same, control means for actuating said last named means, an adjustable metering valve connected into said hydraulic cylinder at opposite sides of its piston so that oil in said hydraulic cylinder and metering valve is moved back and forth through said metering valve by said hydraulic valve piston as said piston rods are reciprocated by said air cylinder piston to determine the speed of the reciprocative movement of said air piston rod and the supported wire support and guide, and automatically operable means for rendering said metering valve momentarily inoperative upon the completion of the initial and intermediate steps of a coil to permit a predetermined jump of said cylinder assembly to a new winding position including a by-pass passage around said metering valve, a reciprocable valve normally closing said by-pass, and a solenoid having a plunger engageable with said reciprocable valve to move the same to open said by-pass upon energization of said solenoid, said solenoid being energized at the completion of the initial and intermediate steps of a coil.

6. In a coil winding machine, in combination, a base, mechanism for supporting a wire support and guide and for oscillating the same during a coil winding operation comprising an air cylinder mounted on said base, a piston in said air cylinder, a piston rod secured to said piston and extending through said air cylinder, a wire support and guide secured to one end of said piston rod for operative movement therewith, a hydraulic cylinder mounted on said base, a piston in said hydraulic cylinder, a piston rod secured to said hydraulic cylinder piston and extending through said hydraulic cylinder, said piston rods being secured together for simultaneous movement, means for alternately introducing and exhausting air to opposite sides of said air piston to reciprocate the same, control means for actuating said last named means, an adjustable metering valve connected into said hydraulic cylinder at opposite sides of its piston so that oil in said hydraulic cylinder and metering valve is moved back and forth through said metering valve by said hydraulic valve piston as said piston rods are reciprocated by said air cylinder piston to determine the speed of the reciprocative movement of said air piston rod and the supported wire support and guide, an oil bypass around said metering valve including a by-pass passage around said metering valve, a reciprocable valve normally closing said by-pass, and a solenoid having a plunger engageable with said reciprocable valve to move the same to open said by-pass upon energization of said solenoid, said solenoid being energized at the completion of the initial and intermediate steps of a coil, and means for rendering said bypass effective to permit free predetermined axial movement of said piston rods and said wire support and guide to change the operative position of the latter in predetermined relation to the winding operation.

7. In a coil winding machine, in combination, a base, a shaft rotatably supported on said base adapted to receive a winding jig, an electric motor for driving said shaft, driving connecting means between said shaft and motor, an air cylinder mounted on said base disposed horizontally including a piston, a hydraulic cylinder aligned with said air cylinder including a piston, a common piston rod extending fully through and beyond both of said cylinders and pistons, said two pistons being secured to said rod, a two solenoid reciprocable valve connected to said air cylinder for alternately supplying air to opposite sides of said air cylinder piston for reciprocating said piston rod, an adjustable metering valve connected into said hydraulic cylinder at opposite sides of its piston so that oil in said hydraulic cylinder and metering valve is moved back and forth through said metering valve by said hydraulic cylinder piston as said piston rod is reciprocated by said air cylinder piston to determine the speed of movement of said piston rod, a wire support and guide supported on one end of said piston rod and disposed beneath a winding jig mounted on said rotatable shaft, a plurality of predetermining counters mounted on said base for predetermining the number of turns in each step of a coil being wound, there being one counter for each step of a coil, two stationary spaced opposed switches mounted on said base in circuit with the solenoids of said solenoid valve for reversing the movement of said piston rod, a control bar mounted on said base and secured to said piston rod for movement therewith, spaced upper and lower dogs adjustably mounted on said bar, a pair of upper and lower dogs being alternately engageable at a time with said stationary switches for winding a step of a coil, and means for jumping the piston rod to engage the next pair of upper and lower dogs with said switches energized by the predetermining counter immediately effective in counting wire turns upon completion of its count.

8. In a coil winding machine, in combination, a base, a shaft rotatably supported on said base adapted to receive a winding jig, an electric motor for driving said shaft, driving connecting means between said shaft and motor, an air cylinder mounted on said base disposed horizontally including a piston, a hydraulic cylinder aligned with said air cylinder including a piston, a common piston rod extending fully through and beyond both of said cylinders and pistons, said two pistons being secured to said rod, a two solenoid reciprocable valve connected to said air cylinder for alternately supplying air to opposite sides of said air cylinder piston for reciprocating said piston rod, an adjustable metering valve connected into said hydraulic cylinder at opposite sides of its piston so that oil in said hydraulic cylinder and metering valve is moved back and forth through said metering valve by said hydraulic cylinder piston as said piston rod is reciprocated by said air cylinder piston to determine the speed of movement of said piston rod, a wire support and guide supported on one end of said piston rod and disposed beneath a winding jig mounted on said rotatable shaft, a plurality of predetermining counters mounted on said base for predetermining the number of turns in each step of a coil being wound, there being one counter for each step of a coil, two stationary spaced opposed switches mounted on said base in circuit with the solenoids of said solenoid valve for reversing the movement of said piston rod, a control bar mounted on said base and secured to said piston rod for movement therewith, spaced upper and lower dogs adjustably mounted on said bar, a pair of upper and lower dogs being alternately engageable at a time with said stationary switches for winding a step of a coil, and means for jumping the piston rod to engage the next pair of upper and lower dogs with said switches energized by the predetermining counter immediately effective in counting wire turns upon completion of its count including a solenoid, an oil by-pass around said metering valve, and a plunger moved by said solenoid to render said by-pass effective.

9. In a coil winding machine, in combination, a base, a shaft rotatably supported on said base adapted to receive a winding jig, an electric motor for driving said shaft, driving connecting means between said shaft and motor, an air cylinder mounted on said base disposed horizontally including a piston, a hydraulic cylinder aligned with said air cylinder including a piston, a common piston rod extending fully through and beyond both of said cylinders and pistons, said two pistons being secured to said rod, a two solenoid reciprocable valve connected to said air cylinder for alternately supplying air to opposite sides of said air cylinder piston for reciprocating said piston rod, an adjustable metering valve connected into said hydraulic cylinder at opposite sides of its piston so that oil in said hydraulic cylinder and metering valve is moved back and forth through said metering valve by said hydraulic cylinder piston as said piston rod is reciprocated by said air cylinder piston to determine the speed of movement of said piston rod, a wire support and guide supported on one end of said piston rod and disposed beneath a winding jig mounted on said rotatable shaft, a plurality of predetermining counters mounted on said base for predetermining the number of turns in each step of a coil being wound, there being one counter for each step of a coil, two stationary spaced opposed switches mounted on said base in circuit with the solenoids of said solenoid valve for reversing the movement of said piston rod, a control bar mounted on said base and secured to said piston rod for movement therewith, spaced upper and lower dogs adjustably mounted on said bar, a pair of upper and lower dogs being alternately engageable at a time with said stationary switches for winding a step of a coil, means for jumping the piston rod to engage the next pair of upper and lower dogs with said switches energized by the predetermining counter immediately effective in counting wire turns upon completion of its count including a solenoid, an oil by-pass around said metering valve, and a plunger moved by said solenoid to render said by-pass effective, a switch associated with each counter controlling a jump for rendering the jump circuit ineffective upon movement of said piston rod to its new winding position, and means for stopping said motor upon completion of a coil.

(References on following page)

References Cited in the file of this patent

UNITED STATES PATENTS

| Number | Name | Date |
|---|---|---|
| 897,676 | Thompson | Sept. 1, 1908 |
| 1,183,196 | Heany | May 16, 1916 |
| 1,579,247 | Rohlfing | Apr. 6, 1926 |
| 1,641,300 | Spencer | Sept. 6, 1927 |
| 1,699,841 | Grout | Jan. 22, 1929 |
| 1,702,475 | Jahnig | Feb. 19, 1929 |
| 1,703,678 | MacNeill | Feb. 26, 1929 |
| 1,807,199 | Dear | May 26, 1931 |
| 1,911,138 | Clute | May 23, 1933 |
| 1,987,909 | Parsons | Jan. 15, 1935 |
| 2,030,988 | Hofstetter | Feb. 18, 1936 |
| 2,122,468 | Hill | July 5, 1938 |
| 2,122,485 | Nelson | July 5, 1938 |
| 2,154,595 | Weirich | Apr. 18, 1939 |
| 2,194,248 | Saul | Mar. 19, 1940 |
| 2,236,411 | Metcalf | Mar. 25, 1941 |
| 2,269,330 | Andren | Jan. 6, 1942 |
| 2,283,393 | Simons | May 19, 1942 |
| 2,326,498 | Rodal | Aug. 10, 1943 |
| 2,348,141 | Luhn | May 2, 1944 |
| 2,415,854 | Sheffield | Feb. 18, 1947 |
| 2,440,665 | Jeffrey | Apr. 27, 1948 |
| 2,445,109 | Ferguson | July 13, 1948 |
| 2,445,937 | Carpenter | July 27, 1948 |
| 2,468,717 | Wennberg | Apr. 26, 1949 |
| 2,579,585 | Klinksiek | Dec. 25, 1951 |
| 2,594,707 | Allen | Apr. 29, 1952 |
| 2,597,375 | Rinehart | May 20, 1952 |
| 2,609,163 | Cesa | Sept. 2, 1952 |